US011733878B1

(12) United States Patent
Horn et al.

(10) Patent No.: US 11,733,878 B1
(45) Date of Patent: *Aug. 22, 2023

(54) DATA ERROR CORRECTION FOR MAGNETIC DISKS

(71) Applicant: Western Digital Technologies, Inc., San Jose, CA (US)

(72) Inventors: Robert Horn, Yorba Linda, CA (US); Derrick Burton, Ladera Ranch, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/707,809

(22) Filed: Mar. 29, 2022

(51) Int. Cl.
*G06F 12/00* (2006.01)
*G06F 3/06* (2006.01)
*G06F 11/10* (2006.01)

(52) U.S. Cl.
CPC ............ *G06F 3/0619* (2013.01); *G06F 3/064* (2013.01); *G06F 3/0676* (2013.01); *G06F 11/1044* (2013.01)

(58) Field of Classification Search
None
See application file for complete search history.

(56) References Cited

U.S. PATENT DOCUMENTS

| | | | |
|---|---|---|---|
| 5,311,521 A | 5/1994 | Fitingof et al. | |
| 5,442,638 A | 8/1995 | Awad et al. | |
| 5,841,600 A | 11/1998 | Kaplan | |
| 5,946,328 A | 8/1999 | Cox et al. | |
| 6,175,891 B1 | 1/2001 | Norman et al. | |
| 7,440,212 B2 | 10/2008 | Saliba | |
| 8,495,470 B2 | 7/2013 | Cideciyan et al. | |
| 8,825,977 B1 | 9/2014 | Syu et al. | |
| 9,823,863 B1 | 11/2017 | Lu et al. | |
| 11,049,520 B1 | 6/2021 | Galbraith et al. | |
| 11,211,094 B1 | 12/2021 | Horn et al. | |
| 2008/0284624 A1 | 11/2008 | Cideciyan et al. | |
| 2012/0023384 A1* | 1/2012 | Naradasi | G06F 11/1012 714/763 |
| 2012/0110417 A1* | 5/2012 | D' Abreu | G06F 11/1012 714/763 |
| 2021/0303185 A1 | 9/2021 | Mishra et al. | |

FOREIGN PATENT DOCUMENTS

EP 0127732 A2 12/1984

* cited by examiner

*Primary Examiner* — Daniel D Tsui
(74) *Attorney, Agent, or Firm* — Barry IP Law, P.C.

(57) ABSTRACT

A Data Storage Device (DSD) includes one or more magnetic disks. One or more data blocks are encoded into a first plurality of Error Correction Code (ECC) sub-blocks including a first ECC sub-block. The first plurality of ECC sub-blocks is encoded into a first ECC super-block. The first ECC sub-block is write-verified by reading the first ECC super-block. If the write-verify passes, a second plurality of ECC sub-blocks is encoded into a subsequent ECC super-block. If the write-verify fails, the first ECC sub-block and a subset of the second plurality of ECC sub-blocks are encoded into the subsequent ECC super-block. In another aspect, in response to the first ECC super-block failing to recover the first ECC sub-block, a subsequent ECC super-block is read and a copy of the first ECC sub-block is used if the copy is detected in the subsequent ECC super-block.

19 Claims, 7 Drawing Sheets

DATA ERROR CORRECTION FOR MAGNETIC DISKS

BACKGROUND

Data Storage Devices (DSDs) are often used to record data in or to reproduce data from a storage medium. One type of storage medium is a rotating magnetic disk, such as in a Hard Disk Drive (HDD) or a Solid-State Hybrid Drive (SSHD) that includes both a rotating magnetic disk and a non-volatile solid-state memory. In such DSDs, a head is positioned in relation to a recording surface on the disk to magnetically read and write data in concentric tracks on the recording surface.

The amount of data that can be stored on a recording surface in a given area (i.e., an areal density) continues to increase with each new generation of DSDs that use a disk to store data. Shingled Magnetic Recording (SMR) has been introduced as a way of increasing the number of Tracks Per Inch (TPI) by making the tracks narrower. Since it is technologically easier to read narrow tracks than to write narrow tracks, SMR increases TPI by using a shingle write head with a stronger magnetic field to overlap tracks like roof shingles. The non-overlapping portion then serves as a narrow track that can be read by a narrower read head. However, this overlap can create a problem when writing data since new writes to a previously overlapped track affects data written in the overlapped track. For this reason, SMR tracks are typically written sequentially so that the newly written data does not affect the data previously written in adjacent tracks. In addition, the use of a stronger magnetic field when writing and narrower tracks worsens the problems of Adjacent Track Interference (ATI) and Wide Area Track Erasure (WATER) where writing data corrupts or erases data in adjacent tracks causing errors when reading the earlier written data.

Other new technologies have been introduced or are in development to allow DSD heads to write more data in a given area using various energy-assisted recording techniques. Such energy-assisted recording techniques can include, for example, Thermal Fly-Height Control (TFC), Heat Assisted Magnetic Recording (HAMR), and Microwave Assisted Magnetic Recording (MAMR). Such technologies typically reduce the scale or physical size of the recorded data, which can introduce more noise and errors when reading the data.

As a result of the increasing areal density of disks, more errors are typically encountered when reading data from disks due to the smaller scale requiring tighter tolerances for head positioning and the increased effects of magnetic fields from writing data in nearby tracks. Error Correction Code (ECC) has been used to add a relatively small amount of redundant data to sectors on the disk that can be used in an algorithm with other data read from the sector to determine if the data has been read correctly and to correct bit errors in the data when the number of bit errors do not exceed a correction capability of the coding. However, the conventional use of ECC is proving to be insufficient to recover data from emerging DSDs with higher areal densities at the high level of reliability expected by users.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Data Storage Device Examples

Figure 1:
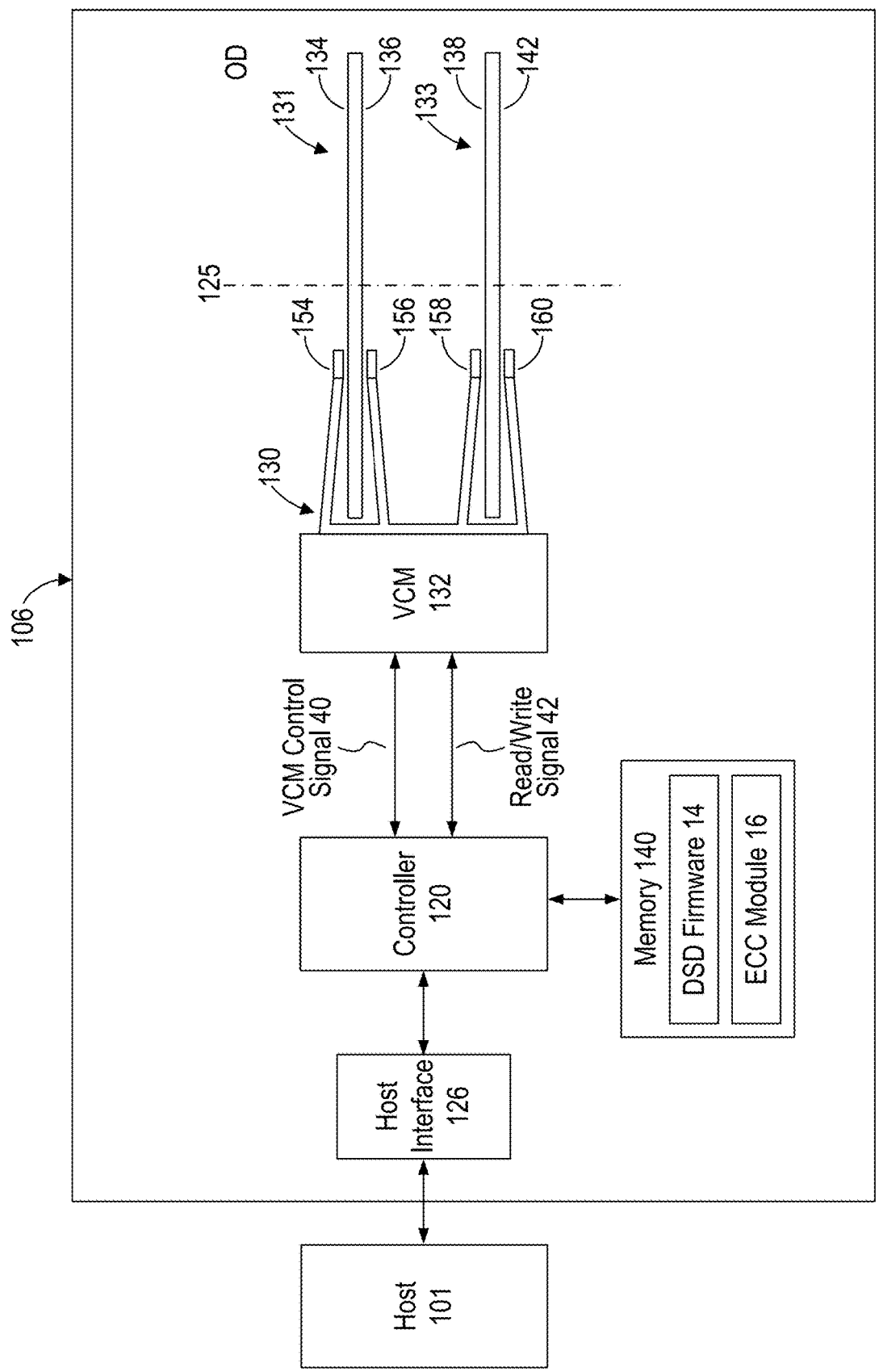
FIG. 1 is a block diagram of a Data Storage Device (DSD) including at least one rotating magnetic disk according to one or more embodiments.

FIG. 1 is a block diagram of a Data Storage Device (DSD) 106 according to one or more embodiments. As shown in the example of FIG. 1, DSD 106 includes Non-Volatile Memory (NVM) in the form of rotating magnetic disks 131 and 133. In other implementations, DSD 106 may include a different number of disks or a different type of NVM such as a solid-state memory in addition to rotating magnetic disks.

In the example of FIG. 1, host 101 communicates with DSD 106 to retrieve data from and store data on disks 131 and 133 of DSD 106. Host 101 and DSD 106 may be separate devices or may be housed together as part of a single electronic device, such as, for example, a server, computing device, desktop, laptop or notebook computer, or other type of electronic device such as a network media player, portable media player, television, digital camera, or Digital Video Recorder (DVR). As used herein, a host can refer to a device that can issue commands to a DSD to store data or retrieve data. In this regard, host 101 may include another storage device such as a smart DSD that can execute applications and communicate with other DSDs.

DSD 106 includes controller 120 that comprises circuitry such as one or more processors for executing instructions including a Central Processing Unit (CPU), microcontroller, Digital Signal Processor (DSP), Application-Specific Integrated Circuit (ASIC), Field Programmable Gate Array (FPGA), Graphics Processing Unit (GPU), hard-wired logic, analog circuitry and/or a combination thereof. In some implementations, controller 120 can include a System on a Chip (SoC), which may be combined with one or both of host interface 126 and memory 140.

Host interface 126 is configured to interface DSD 106 with host 101 and may interface according to a standard such as, for example, Serial Advanced Technology Attachment (SATA), PCI express (PCIe), Small Computer System Interface (SCSI), or Serial Attached SCSI (SAS), Ethernet, or WiFi, and/or one or more other standards. As will be appreciated by those of ordinary skill in the art, host interface 126 can be included as part of controller 120. Although FIG. 1 depicts the co-location of host 101 and DSD 106, in other implementations the two need not be physically co-located. In such implementations, DSD 106 may be located remotely from host 101 and connected to host 101 via a network interface.

In the example of FIG. 1, disks 131 and 133 form a disk pack that is rotated by a spindle motor (not shown) about axis 125. Heads 154, 156, 158, and 160 are positioned to read and write data on a corresponding recording surface of disks 131 or 133. Each of recording surfaces 134, 136, 138, and 142 includes a number of radially spaced, concentric tracks for storing data that include sectors of a fixed data size, such as 512 bytes or 4,096 bytes. As discussed in more detail below with reference to FIG. 2A, data blocks of varying sizes, such as files or other data objects, can be partitioned into data sub-blocks each having a predetermined size that can span one or more sectors.

Heads 154, 156, 158, and 160 are connected to the distal end of actuator 130 which is rotated by Voice Coil Motor (VCM) 132 to position heads 154, 156, 158, and 160 over tracks on disk surfaces 134, 136, 138, and 142, respectively. Controller 120 can include servo control circuitry (not shown) to control the rotation of disks 131 and 133, and to control the position of the heads using VCM control signal 40.

Memory 140 of DSD 106 is configured to store DSD firmware 14 and Error Correction Code (ECC) module 16. In some implementations, controller 120 may execute ECC module 16 to perform the processes of FIGS. 4 to 6A and 6B, as discussed in more detail below. DSD firmware 14 can include computer executable instructions for execution by controller 120 to operate DSD 106. In some implementations, memory 140 may be used to temporarily store data that has been read from recording surfaces 134, 136, 138, and 142 and/or to temporarily store data that is to be written to recording surfaces 134, 136, 138, and 142.

In the example of FIG. 1, memory 140 can be a volatile memory such as Dynamic Random Access Memory (DRAM) or Static Random Access Memory (SRAM) with copies of DSD firmware 14 and ECC module 16 stored in an NVM, such as on disks 131 or 133, or in another NVM of DSD 106. In other implementations, memory 140 can include a non-volatile memory or other type of solid-state memory, such as a Storage Class Memory (SCM).

While the description herein refers to solid-state memory generally, it is understood that solid-state memory may comprise one or more of various types of memory devices such as flash integrated circuits, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), Fast NAND, 3D-XPoint memory, NAND memory (e.g., Single-Level Cell (SLC) memory, Multi-Level Cell (MLC) memory (i.e., two or more levels), or any combination thereof), NOR memory, EEPROM, other discrete NVM chips, or any combination thereof.

ECC module 16 can provide for greater reliability in recovering from read errors by performing ECC at both a sub-block level and at a super-block level where the ECC super-block includes multiple ECC sub-blocks and redundant data that can be used with an algorithm to recover ECC sub-blocks with read errors that exceed the correction capability of the ECC sub-block. In addition, ECC sub-blocks that fail a write-verify operation after being written in the ECC super-block can be duplicated or rewritten in a subsequent ECC super-block to provide additional error recovery capabilities as discussed in more detail below with reference to FIGS. 2A to 3D. This arrangement can better handle a higher frequency of read errors caused by the increased data densities of magnetic disks in emerging DSDs, as compared to the conventional use of ECC at each sector.

In operation, host interface 126 receives host read and write commands from host 101 via host interface 126 for reading data from and writing data to recording surfaces of disks 131 and 133. In response to a write command from host 101, controller 120 may buffer the data to be written for the write commands in memory 140. The data may be written sequentially in some implementations in terms of its logical addressing onto at least a portion of one or more of recording surfaces 134, 136, 138, and 142. In some implementations, the data may be written in overlapping tracks using Shingle Magnetic Recording (SMR) and/or using energy-assisted techniques, such as Thermal Fly-Height Control (TFC), Heat Assisted Magnetic Recording (HAMR), or Microwave Assisted Magnetic Recording (MAMR), to increase the amount of data stored in a given area on the recording surface.

For data to be written on a recording surface, a read/write channel (not shown) of controller 120 may encode the buffered data into write signal 42 which is provided to a head for magnetically writing data on a recording surface that has been assigned the logical addresses for the data in the write command. In addition, controller 120 via a servo system (not shown) can provide VCM control signal 40 to VCM 132 to position the head over a particular track for writing the data.

As discussed in more detail below with reference to the ECC write processes of FIGS. 4 and 5, data blocks are encoded into ECC sub-blocks that include redundant data that can be used to recover the ECC sub-block for up to a predetermined number of bit errors. A plurality of ECC sub-blocks is further encoded into an ECC super-block that is written to the disk that includes redundant data for recovering the ECC sub-blocks of the ECC super-block. After writing the ECC super-block, the ECC sub-blocks are write-verified by at least in part reading the ECC super-block. If any of the ECC sub-blocks fail the write-verify operation, they are encoded into a subsequently written ECC super-block to provide an additional source for recovering the failed ECC sub-block, and in some cases, recovering another ECC super-block.

In response to a read command for data stored on disk 131 or 133, a target physical address corresponding to a logical address of the requested data can be located in a logical to physical mapping. Controller 120 via a servo system seeks a head for the appropriate recording surface to the corresponding physical address. Controller 120 controls the head to magnetically read the requested data and to send the read data as read signal 42.

As discussed in more detail below with reference to the ECC read process of FIGS. 6A and 6B, the ECC super-block can be used to recover one or more ECC sub-blocks that are unable to be recovered at the sub-block level for up to a predetermined number of bit errors. In response to the recovery of one or more ECC sub-blocks failing, one or more subsequent ECC super-blocks can be read to detect a copy of the failed ECC sub-block or sub-blocks. In cases where there are multiple failed ECC sub-blocks in the first ECC super-block, a copy of one of the failed ECC sub-blocks can be used to recover the other failed ECC sub-block or sub-blocks from the first ECC super-block.

As will be appreciated by those of ordinary skill in the art, other implementations of DSD 106 may include a different arrangement of components than shown in the example of FIG. 1. For example, other implementations may include one or more solid-state memories for non-volatilely storing data in addition to disks 131 and 133, as in the case of a Solid-State Hybrid Drive (SSHD). As another example, other implementations may include a different number of disks and recording surfaces than shown in FIG. 1. As yet another example, ECC module 16 can form part of DSD firmware 14.

Figure 2A:
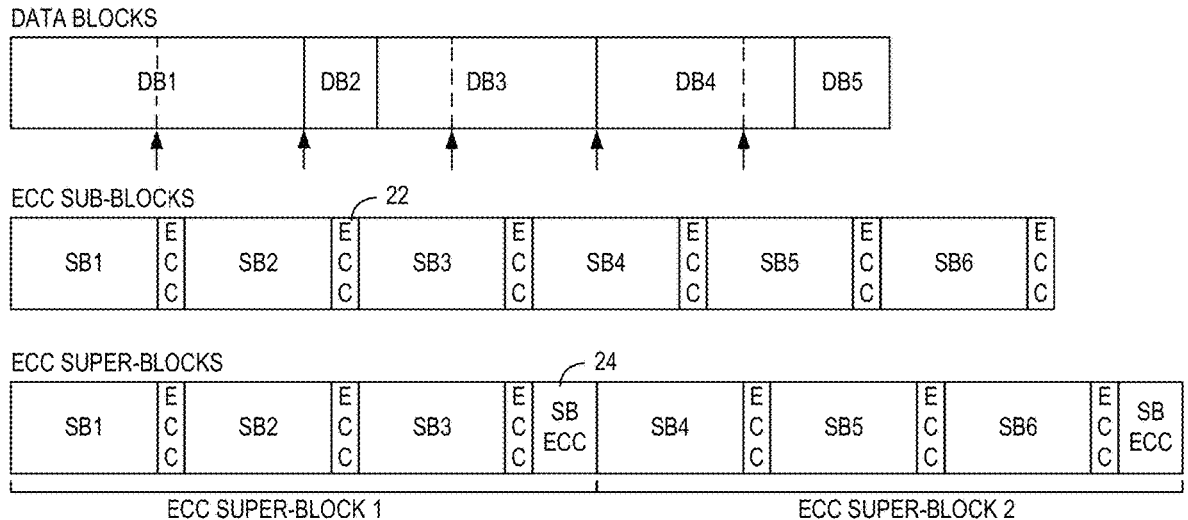
FIG. 2A illustrates the encoding of data blocks into Error Correction Code (ECC) sub-blocks that are encoded into ECC super-blocks according to one or more embodiments.

FIG. 2A illustrates an example of encoding data blocks DB1, DB2, DB3, DB4, and DB5 into ECC sub-blocks that are encoded into ECC super-blocks 1 and 2 that are written to a recording surface. The data blocks DB1 to DB4 may come from, for example, one or more write commands received from host 101. In the example of FIG. 2A, the data blocks are partitioned into data sub-blocks of a predetermined size and then encoded using an ECC algorithm. The ECC encoding that generates ECC sub-blocks 1 to 6 is represented as appending ECC symbols 22 to the end of each data sub-block (i.e., each of SB1 to SB6). Similarly, the ECC encoding that generates each ECC super-block is represented as appending ECC SB symbols 24 to the end of the plurality of ECC sub-blocks included in the ECC super-block. In some implementations, the ECC symbols may be embedded within an ECC sub-block and/or embedded within an ECC super-block.

An example of ECC encoding that embeds ECC symbols within a data block is a Low Density Parity Check (LDPC) code that may be used to encode data into an ECC sub-block. For example, an ECC sub-block may comprise a plurality of LDCP codewords each having embedded ECC symbols. In one implementation, an ECC super-block may provide "M blocks of parity" as a parity block generated over M ECC sub-blocks. In another implementation, an ECC super-block may be generated as an erasure code with M ECC sub-blocks and N additional blocks of parity data.

Figure 2B:
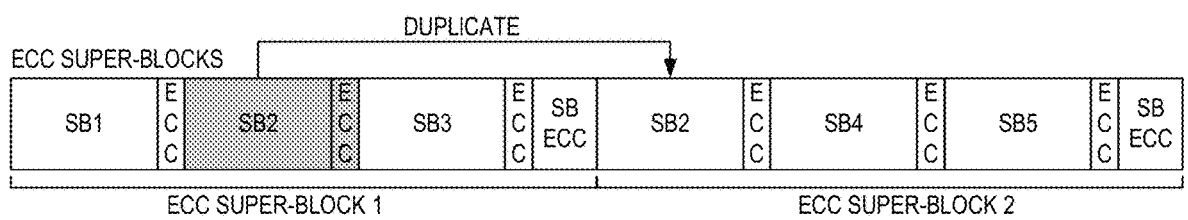
FIG. 2B illustrates an example of an ECC sub-block failing a write-verify and being duplicated in a subsequent ECC super-block according to one or more embodiments.

In the example of FIG. 2A, the first and second ECC super-blocks are written to the recording surface with each of the ECC sub-blocks passing the write-verify as part of the write operation. FIG. 2B shows an example where the second ECC sub-block (i.e., SB2 and its associated ECC data) in the first ECC super-block fails the write-verify, which is designated in FIG. 2B with a shaded block for SB2 and its associated ECC data. The second ECC sub-block is duplicated by encoding the second ECC sub-block into the subsequent ECC super-block, ECC super-block 2. Instead of encoding ECC sub-blocks for SB4, SB5, and SB6 into ECC super-block 2 as in FIG. 2A, ECC sub-blocks for SB2, SB4, and SB5 are encoded into ECC super-block 2 in FIG. 2B to provide a copy of the ECC sub-block for the data sub-block SB2 in the next super-block. An ECC sub-block for SB6 can then be encoded into the ECC super-block that follows ECC super-block 2.

As discussed in more detail below, the subsequent ECC super-block where copies of failed ECC sub-blocks are written may not be the next ECC super-block. In some implementations, the copies of failed ECC sub-blocks may be written in a subsequent ECC super-block that is more than one ECC super-block after the ECC super-block storing the failed ECC sub-block or sub-blocks. For example, some implementations may perform a write-verify on multiple ECC super-blocks together or in the same operation such that the location of the subsequent ECC super-block storing the copy of a failed ECC sub-block is a predetermined number of ECC super-blocks after the ECC super-block storing the failed ECC sub-block. The number of intervening ECC super-blocks or offset of ECC super-blocks between the ECC super-block storing the failed ECC sub-block and the subsequent ECC super-block storing the copy of the failed ECC sub-block may therefore correspond to the number of ECC super-blocks that are write-verified together after being written.

In this regard, performing the write-verify operation for multiple ECC super-blocks, which can span several tracks on the recording surface, can better detect errors that may be caused by inter-track interference caused by magnetic fields when writing an adjacent track. Examples of such inter-track interference can include Adjacent Track Interference (ATI) or Wide Area Track Erasure (WATER) that corrupts or erases the data recorded in a previously written track due to one or more write operations performed in a nearby track. These problems may be particularly prevalent in implementations where the disk is written using SMR with narrow overlapping tracks.

In this regard, delaying a write-verify operation in the case of SMR until after several tracks have been written can enable the DSD to verify the data after the most likely degradation has occurred and provides greater confidence in the write-verify operation. In an SMR example, data verified after several subsequent tracks have been written is less likely to be disturbed again by nearby track writes since SMR writing typically continues sequentially in one direction.

During a read operation, the first copy of SB2 may remain unrecoverable when reading the first ECC super-block with the first ECC super-block being unable to recover the ECC sub-block due to the number of errors in the first ECC super-block. However, the duplicate ECC sub-block for SB2 in the second ECC super-block can be recoverable using the ECC from the duplicate ECC sub-block or from the second ECC super-block, if needed.

In some implementations, the logical addresses of the data blocks that have been encoded into ECC sub-blocks can be included in a header of the ECC sub-blocks and/or of the ECC super-block so that the locations of the data blocks are self-identifying when being read. The logical addresses in the header of the ECC sub-block and/or of the ECC super-block may indicate the sequence of the data blocks encoded into the ECC sub-block and/or the ECC super-block. Controller 120 can use the logical addresses to determine the sequence of ECC sub-blocks written to the recording surface so that the sequence can be reconstructed during a read operation. In other implementations, controller 120 may maintain a mapping table or another type of data structure for determining the sequence of ECC sub-blocks written to the recording surface.

In some implementations, the ECC sub-block for SB2 in the first ECC super-block may be recoverable during a read operation, such as by using the ECC of the ECC sub-block or of the first ECC super-block, such that when the duplicate ECC sub-block for SB2 in the second ECC super-block is read, it can be identified as a duplicate and discarded. As used herein, discarded may refer to not buffering the data from the duplicate ECC sub-block, not retaining the data read from the duplicate ECC sub-block, and/or skipping the reading of at least a portion of the ECC sub-block.

Figure 2C:
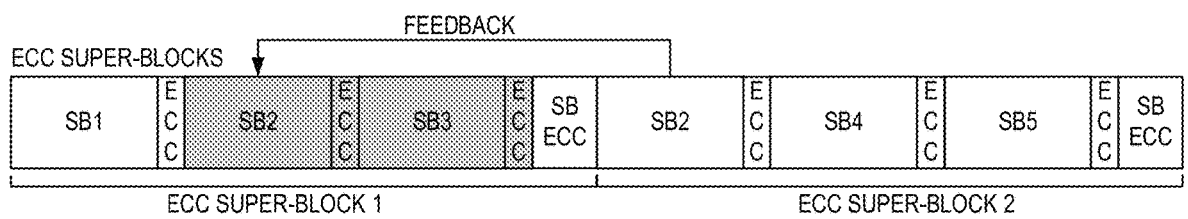
FIG. 2C illustrates an example of the duplicated ECC sub-block of FIG. 2B being used to recover multiple ECC sub-blocks in a first ECC super-block according to one or more embodiments.

FIG. 2C shows an example where the first copy of the ECC sub-block for SB2 in the first ECC super-block is unrecoverable during a read operation together with the ECC sub-block for SB3. In other words, the number of errors in the first copy of the ECC sub-block for SB2 and the ECC sub-block for SB3 exceeds the correction capability of both the ECC sub-blocks and the first ECC super-block. When the duplicate of the ECC sub-block for SB2 is successfully recovered from the second ECC super-block, the duplicate ECC sub-block for SB2 is used as feedback to decode the first ECC super-block. That is, when the first unrecoverable copy of the ECC sub-block for SB2 is replaced with the duplicate copy, it can enable the first ECC super-block to decode the ECC sub-blocks for both SB2 and SB3, thereby improving the correction capability of the first ECC super-block.

Any suitable number of ECC sub-blocks may be encoded into an ECC super-block based on a desired balance between the additional storage space needed for the ECC portions or redundant data of additional super-blocks (e.g., SB ECC 24 in FIG. 2A) and the improved recovery capability resulting from having more ECC super-blocks. The read throughput performance may also decrease slightly due to having to read additional redundant data if there are more ECC super-blocks. On one hand, increasing the number of ECC sub-blocks per ECC super-block increases the format efficiency of the recording surface by requiring less ECC portions or redundant data and can provide a slightly improved read throughput since less redundant data may need to be read. On the other hand, decreasing the number of ECC sub-blocks per ECC super-block improves the correction capability of the ECC super-blocks.

Figure 3A:
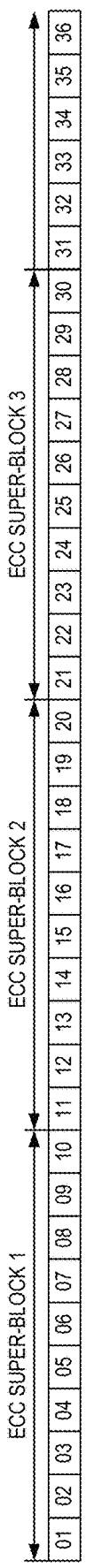
FIG. 3A illustrates an example where ten ECC sub-blocks are encoded into each ECC super-block according to one or more embodiments.

FIG. 3A shows an example where ten ECC sub-blocks are encoded into each ECC super-block. In the example of FIG. 3A, all the ECC sub-blocks pass the write-verify during a write operation, so none of the ECC sub-blocks are duplicated in subsequent ECC super-blocks.

Figure 3B:
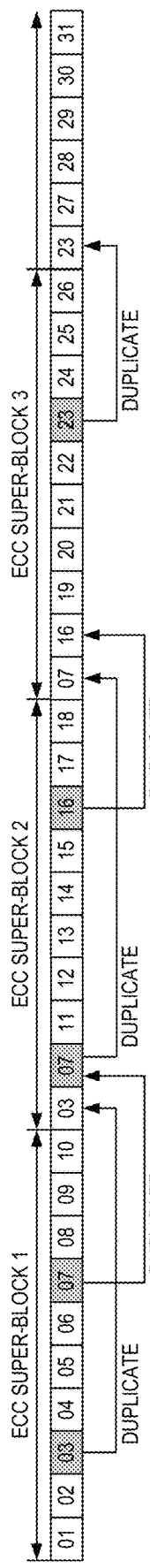
FIG. 3B illustrates an example of the duplication of multiple failed ECC sub-blocks in subsequently written ECC super-blocks according to one or more embodiments.

In the example of FIG. 3B, however, the shaded ECC sub-blocks fail the write-verify and are therefore duplicated in a downstream or subsequently written ECC super-block. In FIG. 3B, the subsequent ECC super-block is shown as the next ECC super-block. However, as noted above, the subsequent ECC super-block is not necessarily the next ECC super-block. In some implementations, the location of the subsequent ECC super-block can be based on the number of ECC super-blocks that are write-verified in a single write-verify operation. In such implementations, the subsequent ECC super-block can be a predetermined number of ECC super-blocks away corresponding to the number of ECC super-blocks that are write-verified in a single write-verify operation. In addition, the offset or predetermined number of ECC super-blocks used to locate the subsequent ECC super-block can vary across the diameter of the recording surface as a result of the write-verify being performed across multiple tracks, which may include different numbers of ECC super-blocks depending on the circumference of the tracks.

Figure 3C:
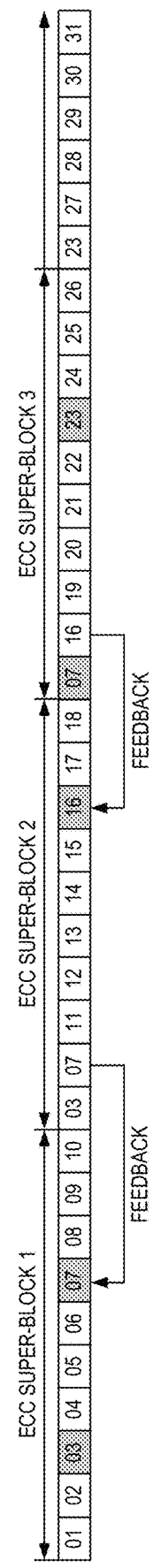
FIG. 3C illustrates an example where earlier written ECC super-blocks are recovered by cascading data from ECC sub-blocks in subsequently written ECC super-blocks according to one or more embodiments.

FIG. 3C shows an example during a read operation of the super-blocks written in FIG. 3B. As shown in FIG. 3C, a duplicate ECC sub-block is successfully recovered from a subsequent ECC super-block, and the duplicate is used as feedback to recover an upstream or earlier written ECC super-block. This process may cascade to further subsequent ECC super-blocks. For example, when ECC sub-block 16 is recovered from ECC super-block 3, it is used as feedback to decode ECC super-block 2 as shown in FIG. 3C. If ECC super-block 2 is successfully decoded using this feedback, previously unrecovered ECC sub-block 07 is recovered. The recovered ECC sub-block 07 may be used as feedback to decode ECC super-block 1 as shown in FIG. 3C. In some cases, duplicating ECC sub-blocks downstream and then feeding back the duplicated ECC sub-blocks during a read operation can improve the performance of the DSD in terms of format efficiency by enabling a greater number of ECC sub-blocks to be encoded into an ECC super-block while maintaining a desired throughput performance as compared to a system that does not employ feedback.

Figure 3D:
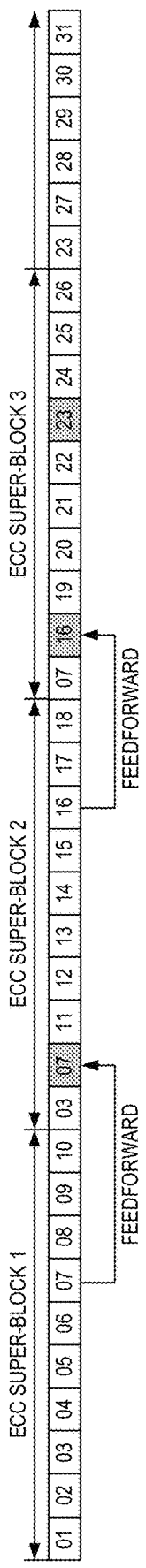
FIG. 3D illustrates an example where a subsequently written ECC super-block is recovered by cascading data from ECC sub-blocks in earlier written ECC super-blocks according to one or more embodiments.

FIG. 3D shows an example where a copy of an ECC sub-block is successfully recovered and used as feedforward to decode a downstream or subsequently written ECC super-block. This feedforward process may also cascade further downstream to other subsequently written ECC super-blocks. For example, when reading ECC super-block 1, the first copy of ECC sub-block 07 may be recovered and used as feedforward to decode ECC super-block 2 if the duplicate ECC sub-block 07 is unrecoverable by the corresponding ECC sub-block. When ECC super-block 2 is successfully decoded, the recovered ECC sub-block 16 may be used as feedforward to decode ECC super-block 3. This cascading feedforward use of recovered ECC sub-blocks may continue to additional subsequent ECC super-blocks and can further improve the correction capability of the ECC super-blocks.

Referring again to the example of FIG. 3C, when using a copy of an ECC sub-block as feedback, the position within the subsequent ECC super-block to insert the copy can be determined based on sequence numbers. For example, when the copy of ECC sub-block 07 in ECC super-block 2 is recovered, it can be used as feedback into ECC super-block 1 at the position corresponding to ECC sub-block 07. When using a recovered ECC sub-block as feedforward to recover a subsequent ECC super-block, the position of the ECC sub-block in the subsequent ECC super-block may be inferred in some implementations.

Referring to the example of FIG. 3D, it can be determined from the gap in the sequence numbers that the first two ECC sub-blocks in ECC super-block 2 are copies from ECC super-block 1. However, in one implementation, it may not be known which ECC sub-block was copied from ECC super-block 1. For example, if when reading ECC super-block 2, ECC sub-block 07 cannot be recovered, it can be determined that the location stores a copied data block from ECC super-block 1 from the gap in the sequence numbers, but which data block was copied may be indeterminate. In some implementations, it may be inferred that the lowest quality ECC sub-block from the previous ECC super-block was copied into the subsequent ECC super-block. For example, when reading ECC super-block 1 in FIG. 3D, ECC sub-block 07 may be unrecoverable at the ECC sub-block level but recovered at the ECC super-block level. Therefore, it may be inferred that ECC sub-block 07 was copied into the subsequent ECC super-block 2.

In the case where all the ECC sub-blocks are recovered at the ECC sub-block level when reading ECC super-block 1, the lowest quality ECC sub-block (e.g., the ECC sub-block having the most bit errors or a maximum number of decoding iterations) may be inferred as the ECC sub-block copied into the subsequent ECC super-block 2 in some implementations. In another implementation, multiple attempts to recover the subsequent ECC super-block 2 may be attempted using feedforward by trying different ECC sub-blocks from the earlier written ECC super-block 1. That is, a first attempt may be made using the lowest quality ECC sub-block, a second attempt using the next lowest quality ECC sub-block, and so on. In yet other implementations, each ECC super-block may be recorded with metadata (e.g., in a header) that identifies the sequence of ECC sub-blocks contained therein, including any ECC sub-blocks copied from earlier written or upstream ECC super-block(s). In such implementations, the metadata can be used to select which ECC sub-blocks to feedforward from an earlier written ECC super-block for use in decoding a subsequent ECC super-block.

Example Processes

Figure 4:
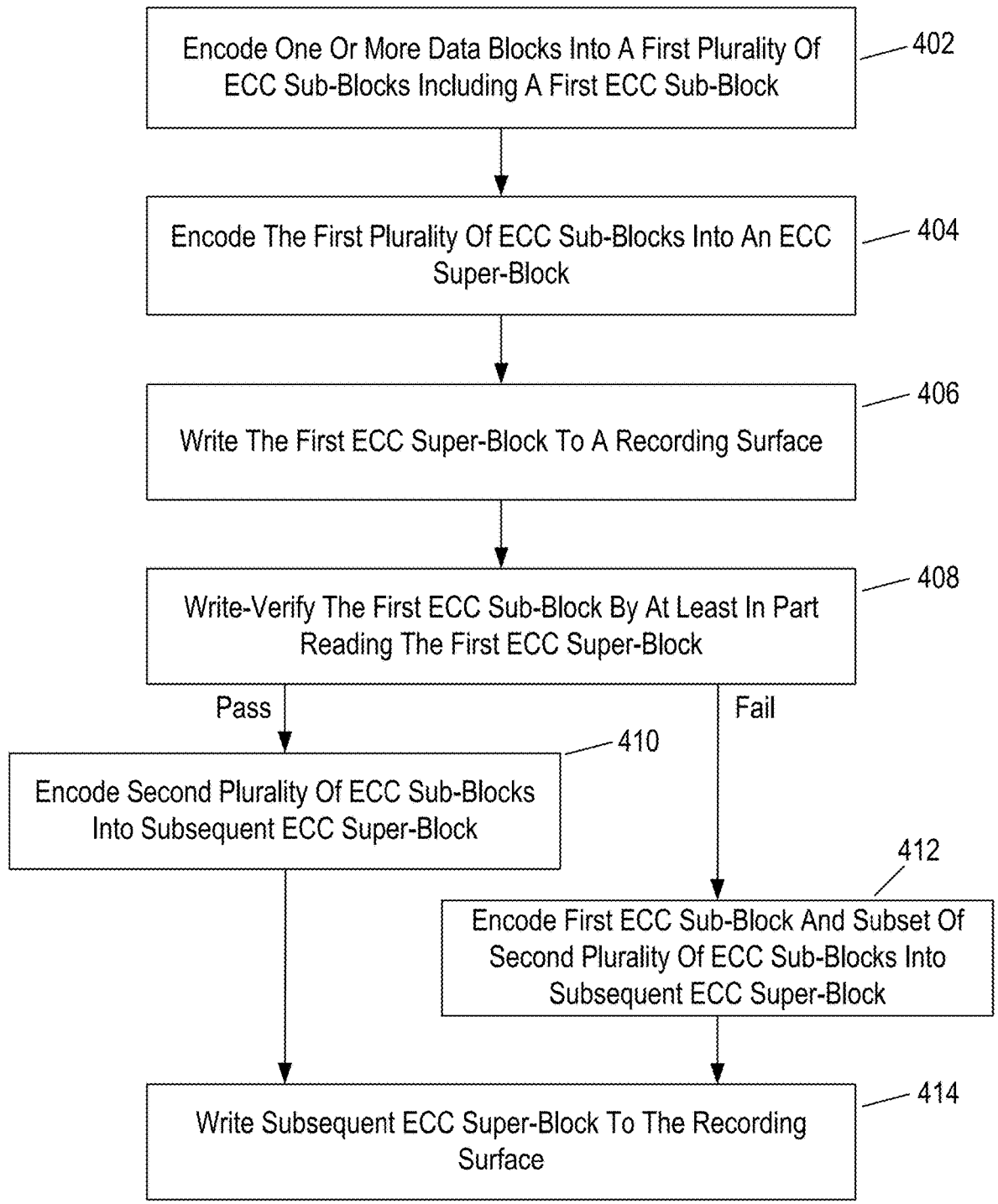
FIG. 4 is a flowchart for an ECC write process according to one or more embodiments.

FIG. 4 is a flowchart for an ECC write process according to one or more embodiments. The process of FIG. 4 can be performed by circuitry of a DSD executing a firmware of the DSD, such as controller 120 executing DSD firmware 14 and ECC module 16 in FIG. 1.

In block 402, one or more data blocks are encoded into a first plurality of ECC sub-blocks, which includes a first ECC sub-block. The data blocks can be received, for example, as one or more write commands from a host or may include data blocks to be written to the recording surface as part of a maintenance operation of the DSD, such as to refresh or relocate previously written data. With reference to the example of FIG. 2A discussed above, data blocks DB1 to DB5 are encoded into ECC sub-blocks for SB1 to SB6. As shown in the example of FIG. 2A, each of the ECC sub-blocks have the same predetermined size and include a portion of redundant data that can be used to recover the ECC sub-block up to a certain number of bit errors. The encoding in block 402 may embed or append ECC symbols within the ECC sub-block, using an LDPC code or an erasure code, for example.

In block 404, the first plurality of ECC sub-blocks is encoded into an ECC super-block. As discussed above, an integral number of ECC sub-blocks is encoded into each ECC super-block such that each of the ECC super-blocks have the same predetermined size and include a portion of redundant data that can be used to recover the ECC super-block up to a certain number of bit errors. As with the encoding of the ECC sub-blocks in block 402, the encoding of the ECC super-block in block 404 can embed or append ECC symbols in the ECC super-block, using, for example, an LDPC code or an erasure code.

In block 406, the first ECC super-block is written to a recording surface of a magnetic disk using a corresponding head of the DSD. In some implementations, each ECC sub-block can correspond to one or more physical sectors on the disk and the ECC super-block can correspond to one or more tracks of sectors or a portion of a single track.

In block 408, the circuitry of the DSD write-verifies the first ECC sub-block by at least in part reading the first ECC super-block. The write-verify can include reading the first ECC super-block during a second pass along the track or tracks including the first ECC super-block. In some implementations, the ECC sub-block passes if its data can be read without any errors, which can be determined by performing a parity check or other error detection using the redundant data portion of the ECC sub-block. As discussed above, some implementations may wait for multiple tracks to be written, which can include multiple ECC super-blocks, before performing the write-verify of block 408. Performing the write-verify after multiple tracks are written can better account for degradation that may occur due to inter-track interference, such as due to ATI or WATER, where magnetic fields when writing a nearby track corrupt or erase the data recorded in a previously written track. These problems may be particularly prevalent in implementations where the disk is written using SMR with narrow overlapping tracks.

In response to the first ECC sub-block passing the write-verify in block 408, a second plurality of ECC sub-blocks is encoded into a subsequent ECC super-block in block 410. In cases where multiple ECC super-blocks are written before performing the write-verify in block 408, the subsequent ECC super-block can be downstream from the first ECC super-block by one or more intervening ECC super-blocks. In other words, the subsequent ECC super-block is not necessarily the next ECC super-block that follows the first ECC super-block. The subsequent ECC super-block may also include additional failed ECC sub-blocks from the first ECC super-block and/or from intervening ECC super-blocks between the first ECC super-block and the subsequent ECC super-block in some implementations.

In response to the first ECC sub-block failing the write-verify in block 408, the first ECC sub-block and a subset of the second plurality of ECC sub-blocks are encoded into a subsequent ECC super-block in block 412 to provide a copy of the failed ECC sub-block in the subsequent ECC super-block. As discussed above, the copy can be used if needed for recovery of the same or other ECC sub-blocks in the first ECC super-block or to replace the first ECC sub-block to complete a read command.

In block 414, the subsequent super-block is written to the recording surface with either the full set of the second plurality of ECC sub-blocks or with one or more copies of ECC sub-blocks that failed a write-verify of an earlier written ECC super-block replacing one or more ECC sub-blocks of the second plurality of ECC sub-blocks.

Those of ordinary skill in the art will appreciate that other implementations of the write process of FIG. 4 may differ. For example, in some implementations, one or more failed ECC sub-blocks may be temporarily stored or buffered in a memory (e.g., memory 140 in FIG. 1) until additional data blocks are queued to be written to reach a predetermined size for a next ECC super-block or group of ECC super-blocks. As another example variation, the data blocks in block 402 may first be partitioned into data sub-blocks to match a predetermined size for encoding the data blocks into ECC sub-blocks, as is discussed in the example ECC write process of FIG. 5 below.

Figure 5:
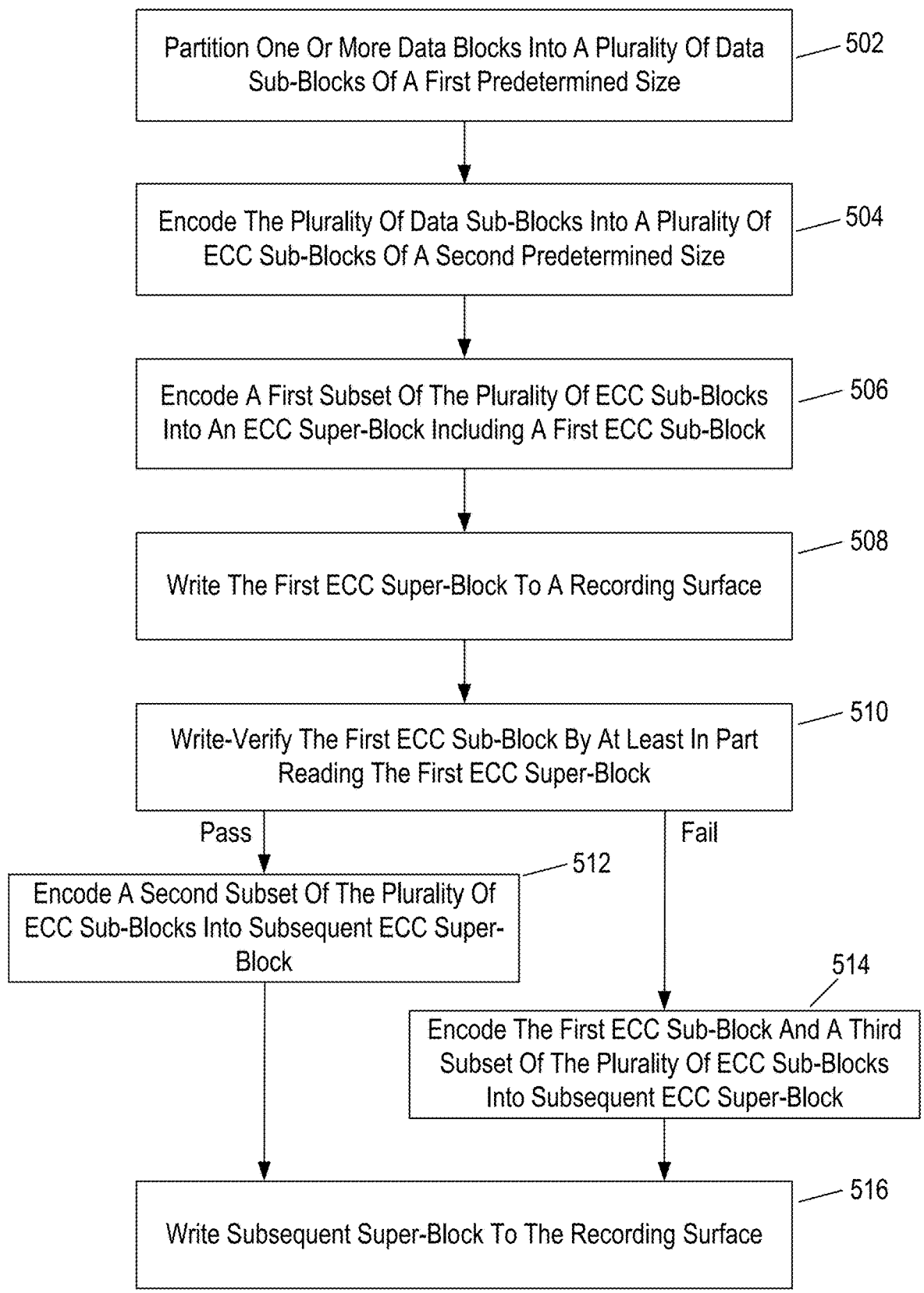
FIG. 5 is a flowchart for an ECC write process including the partitioning of data blocks into data sub-blocks of a predetermined size according to one or more embodiments.

FIG. 5 is a flowchart for an ECC write process including the partitioning of data blocks into data sub-blocks of a predetermined size according to one or more embodiments. The process of FIG. 5 can be performed by circuitry of a DSD executing a firmware of the DSD, such as controller 120 executing DSD firmware 14 and ECC module 16 in FIG. 1. In one aspect, the ECC write process of FIG. 5 differs in the timing of encoding from the ECC write process of FIG. 4 discussed above in that subsets of an original plurality of already encoded ECC sub-blocks are further encoded into different ECC super-blocks, as opposed to encoding a first plurality of data blocks that correspond to a single ECC super-block size.

In block 502, one or more data blocks are partitioned into a plurality of data sub-blocks that each have a first predetermined size. The data blocks may be received from a host as one or more write commands or may include data to be written for a maintenance operation of the DSD.

In block 504, the plurality of data sub-blocks is encoded into a plurality of ECC sub-blocks of a second predetermined size that is larger than the first predetermined size. As discussed above, the encoded ECC sub-blocks include redundant data that is used to correct errors in the ECC sub-block. The redundant data adds to the size of the data sub-blocks. The encoding in block 504 may embed or append ECC symbols within each ECC sub-block, using, for example, an LDPC code or an erasure code.

In block 506, a first subset of the plurality of ECC sub-blocks is encoded into an ECC super-block that includes a first ECC sub-block of the plurality of ECC sub-blocks. The ECC super-block has a larger size than a cumulative size of the ECC sub-blocks forming the ECC super-block. As discussed above, an integral number of ECC sub-blocks is encoded into each ECC super-block such that each of the ECC super-blocks have the same predetermined size and includes redundant data that can be used to recover the ECC super-block up to a certain number of bit errors. As with the encoding of the ECC sub-blocks in block 504, the encoding of the ECC super-block in block 506 can embed ECC symbols into the ECC super-block, using, for example, an LDPC code or an erasure code.

In block 508, the first ECC super-block is written to a recording surface of a magnetic disk using a corresponding head of the DSD. In some implementations, each ECC sub-block can correspond to one or more physical sectors on the disk with the ECC super-block corresponding to one or more tracks of sectors or a portion of a single track.

In block 510, the circuitry of the DSD write-verifies the first ECC sub-block by at least in part reading the first ECC super-block. The write-verify can include reading the first ECC super-block during a second pass along the track or tracks including the first ECC super-block. In some implementations, the ECC sub-block passes if its data can be read without any errors, which can be determined by performing a parity check or other error detection using the redundant data portion of the ECC sub-block. In addition, some implementations may wait for multiple tracks to be written, which can include multiple ECC super-blocks, before performing the write-verify of block 510. Performing the write-verify after multiple tracks are written can better account for degradation that may occur due to ATI or WATER. As noted above, these problems can be particularly prevalent in SMR implementations.

In response to the first ECC sub-block passing the write-verify in block 510, a second subset of the plurality of ECC sub-blocks are encoded into a subsequent ECC super-block in block 512. In cases where multiple ECC super-blocks are written before performing the write-verify in block 510, the subsequent ECC super-block can be downstream from the first ECC super-block by one or more intervening ECC super-blocks. In other words, the subsequent ECC super-block is not necessarily the next ECC super-block that follows the first ECC super-block. In addition, the subsequent ECC super-block may include other failed ECC sub-blocks from the first ECC super-block and/or from intervening ECC super-blocks between the first ECC super-block and the subsequent ECC super-block in some implementations.

In response to the first ECC sub-block failing the write-verify in block 510, the first ECC sub-block and a third subset of the plurality of ECC sub-blocks are encoded into the subsequent ECC super-block in block 514 to provide a copy of the failed first ECC sub-block in the subsequent ECC super-block. The third subset of ECC sub-blocks may include one less ECC sub-block than the second subset of ECC sub-blocks used in block 512 to make room for the failed first ECC sub-block. In other cases, the third subset of ECC sub-blocks may include more than one less ECC sub-block than the second subset of ECC sub-blocks to make room for additional failed ECC sub-blocks. As discussed above, the copy of the first ECC sub-block in the subsequent ECC super-block can be used if needed for recovery of the same or other ECC sub-blocks in the first ECC super-block or to replace the first ECC sub-block to complete a read command.

In block 516, the subsequent super-block is written to the recording surface with either the full second subset of the plurality of ECC sub-blocks or with a smaller third subset of the plurality of ECC sub-blocks and one or more copies of ECC sub-blocks that failed a write-verify of an earlier written ECC super-block, such as the first ECC super-block.

Those of ordinary skill in the art will appreciate that other implementations of the ECC write process of FIG. 5 may differ. For example, in some implementations, one or more failed ECC sub-blocks may be temporarily stored or buffered in a memory (e.g., memory 140 in FIG. 1) until additional data blocks are to be written to reach a predetermined size for a subsequent ECC super-block.

Figure 6A:
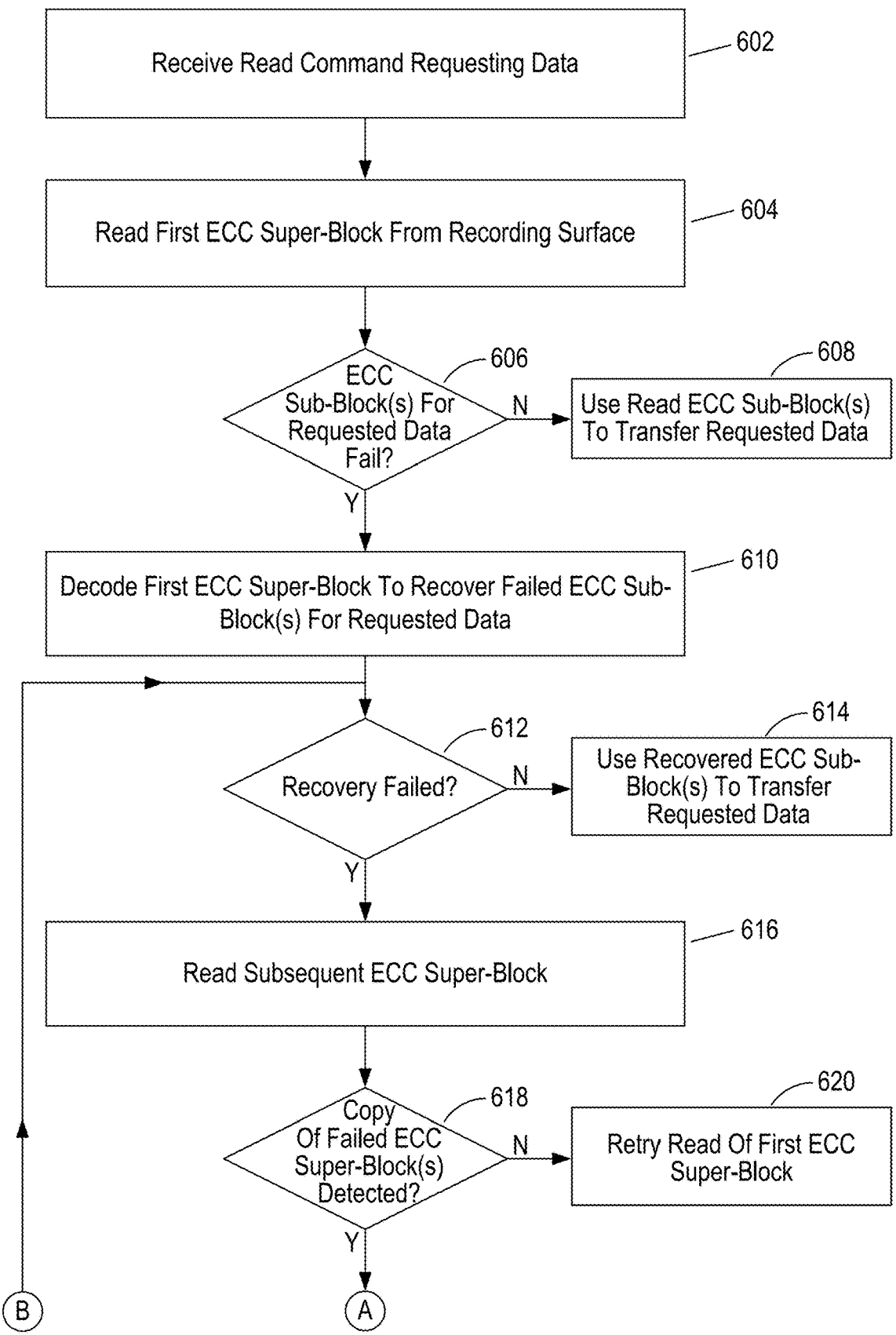
FIG. 6A is a flowchart for a first portion of an ECC read process according to one or more embodiments.
Figure 6B:
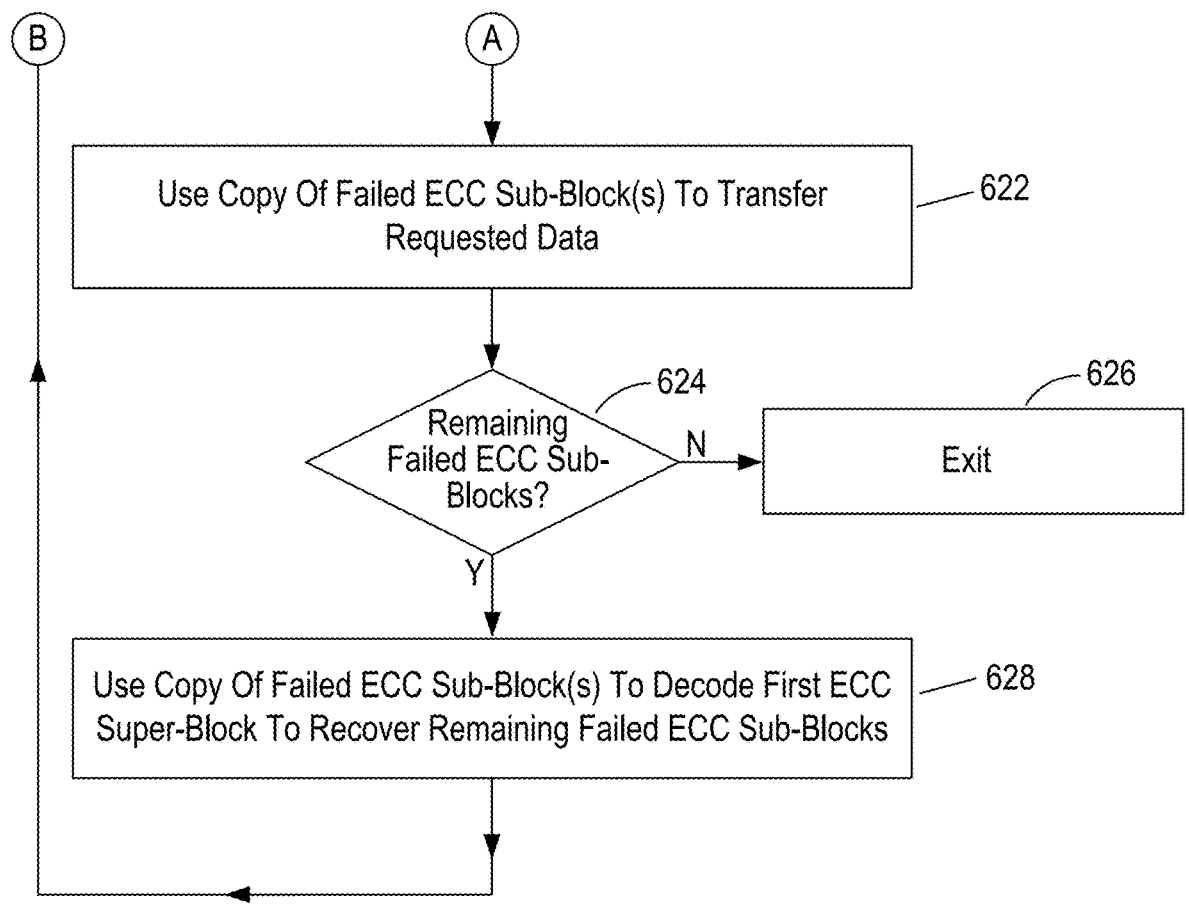
FIG. 6B is a flowchart for a second portion of the ECC read process continuing from FIG. 6A according to one or more embodiments.

FIGS. 6A and 6B provide a flowchart for an ECC read process according to one or more embodiments. The ECC read process of FIGS. 6A and 6B can be performed by circuitry of a DSD executing a firmware of the DSD, such as controller 120 executing DSD firmware 14 and ECC module 16 in FIG. 1.

In block 602, the circuitry receives a read command requesting data stored on a magnetic disk of the DSD. The read command may come from a host or may be part of a maintenance operation performed by the DSD, such as rewriting data on the disk to ensure integrity of the data.

In block 604, a first ECC super-block is read from a recording surface using a corresponding head of the DSD. In some cases, the read command may only be for data included in one or more data sub-blocks encoded into one or more ECC sub-blocks of the first ECC super-block. In other cases, the read command may request data that spans multiple ECC super-blocks including the first ECC super-block.

In block 606, it is determined whether any of the ECC sub-blocks of the first ECC super-block could not be read or recovered at the sub-block level. In this regard, a read ECC sub-block may include errors that can be corrected using the redundant data for the ECC sub-block at the sub-block level. In such cases, the corrected ECC sub-block can be used without needing to read a copy of the ECC sub-block or decoding the first ECC super-block. In some implementations, a threshold number of read retries may be attempted before determining in block 606 that reading the ECC sub-block has failed. However, decoding at the ECC super-block level can save time in some implementations as compared to performing read retries. If none of the ECC sub-blocks fail in block 606, the circuitry in block 608 uses one or more of the ECC sub-blocks read from the first ECC super-block that correspond to data requested by the read command to transfer the requested read data.

On the other hand, if one or more of the ECC sub-blocks for the requested data fail in block 606, the circuitry decodes the first ECC super-block to recover the failed ECC sub-blocks. In some cases, one or more of the failed ECC sub-blocks from the first ECC super-block may be recovered at the sub-block level and then used to recover other failed ECC sub-blocks at the super-block level that have more errors. In this regard, the recovery of failed ECC sub-blocks may include ECC sub-blocks that do not correspond to data requested by the read command. In such implementations, the integrity of the ECC super-blocks may be maintained or improved over time with the decoding of ECC super-blocks and the replacement of failed ECC sub-blocks.

In block 612, it is determined whether the recovery of the failed ECC sub-blocks failed to be recovered by decoding the first ECC super-block. If not, the recovered ECC sub-block or sub-blocks for the requested data are used in block 614 to transfer the requested data for the read command.

On the other hand, if one or more of the failed ECC sub-blocks were not recovered in the decoding of the first ECC super-block, a subsequent ECC superblock is read in block 616. The subsequent ECC super-block can include a next ECC super-block in some implementations. In other implementations, such as where the write-verify discussed above for the ECC write processes of FIGS. 4 and 5 takes place after writing more than one ECC super-block, the subsequent ECC super-block may be located a fixed number of ECC super-blocks after the first ECC super-block that corresponds to an interval for performing the write-verify operation when writing the ECC super-blocks.

The interval for performing the write-verify operation, and as a result, the number of intervening ECC super-blocks between the first ECC super-block and the subsequent ECC super-block that may store a copy of a failed ECC sub-block from the first ECC super-block, may vary depending on a location of the tracks being read across the diameter of the disk. For example, ECC super-blocks located in zones of tracks closer to an Inner-Diameter (ID) location may perform a write-verify more often (e.g., after writing two ECC super-blocks) as compared to tracks closer to an Outer-Diameter (OD) location (e.g., after writing eight ECC super-blocks) since a smaller number of ECC super-blocks may span more tracks at the ID location than at the OD location. In some implementations, the circuitry may keep track of the interval between a first ECC super-block and a subsequent ECC super-block where a duplicate ECC sub-block may be stored for different zones of tracks with respect to the relative diameter location of the tracks.

In block 618 of FIG. 6A, it is determined whether a copy or copies of the failed ECC sub-block or sub-blocks are detected in the subsequent ECC super-block. If not, the circuitry may retry reading the first ECC super-block in an attempt to recover more data that may enable decoding any remaining failed ECC sub-blocks at the sub-block level or at the super-block level.

On the other hand, if a copy of any of the remaining failed ECC sub-blocks for the requested data is detected in the subsequent ECC super-block, the circuitry in block 622 of FIG. 6B uses the copy or copies to transfer the requested data for the read command. In block 624, it is determined whether there are any remaining failed ECC sub-blocks needed for completing the read command. If not, the read process exits at block 626. In other implementations, the process may continue to try to recover remaining failed ECC sub-blocks that are not needed for completing the read command to further improve the overall reliability of the ECC super-blocks, as noted above.

If there are remaining ECC sub-blocks needed for completion of the read command, the circuitry in block 628 uses the copy of any failed ECC sub-blocks recovered or read from the subsequent ECC super-block to decode the first ECC super-block to recover the remaining failed ECC sub-blocks from the first ECC super-block for the requested data. The process then returns to block 612 in FIG. 6A to determine if the recovery from decoding the first ECC super-block failed. Blocks 612 to 628 of FIGS. 6A and 6B may be repeated if needed to continue reading a next subsequent ECC super-block that may include a second copy of a failed ECC sub-block from the first ECC super-block. This use of feedback from one or more subsequent ECC super-blocks can allow for a cascading of correction capability from one subsequent ECC super-block back to an earlier written ECC super-block to further enhance the correction capability of the ECC super-blocks.

Those of ordinary skill in the art will appreciate with reference to the present disclosure that the order of blocks for the ECC read process of FIGS. 6A and 6B may differ in other implementations. For example, other implementations may include reading multiple ECC super-blocks in block 606 that may also include reading data from one or more subsequent ECC super-blocks. This additional data may be buffered and used as feedback for the first ECC super-block without having to read the one or more subsequent ECC super-blocks in block 616.

As discussed above, the foregoing use of ECC sub-blocks and ECC super-blocks can allow for a greater tolerance of errors when reading data from a magnetic disk. In addition, by writing copies of ECC sub-blocks that fail a write-verify in a subsequent ECC super-block, an even greater data reliability is achieved since the duplicated ECC sub-blocks can be used to recover other failed ECC sub-blocks in earlier or later written ECC super-blocks by cascading feedback or feedforward, respectively, to decode the earlier or later written ECC super-block.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
one or more magnetic disks, wherein each magnetic disk of the one or more magnetic disks includes at least one recording surface configured to store data;
one or more heads configured to read data from and write data to a respective recording surface of the one or more disks; and
circuitry configured to:
encode one or more data blocks into a first plurality of Error Correction Code (ECC) sub-blocks including a first ECC sub-block;
encode the first plurality of ECC sub-blocks into a first ECC super-block;
write the first ECC super-block to a recording surface of the one or more magnetic disks using a corresponding head of the one or more heads;
write-verify the first ECC sub-block by at least in part reading the first ECC super-block using the corresponding head;
in response to the write-verify of the first ECC sub-block passing, encode a second plurality of ECC sub-blocks into a subsequent ECC super-block;
in response to the write-verify of the first ECC sub-block failing, encode the first ECC sub-block and a subset of the second plurality of ECC sub-blocks into the subsequent ECC super-block; and
write the subsequent ECC super-block to the recording surface using the corresponding head.

2. The DSD of claim 1, wherein the circuitry is further configured to encode a plurality of data blocks into a single ECC sub-block.

3. The DSD of claim 1, wherein the one or more data blocks include at least two data blocks of different sizes.

4. The DSD of claim 1, wherein the circuitry is further configured to recover the first ECC sub-block by decoding the first ECC super-block.

5. The DSD of claim 4, wherein the circuitry is further configured to, in response to the first ECC super-block recovering the first ECC sub-block, read the subsequent ECC super-block from the recording surface and discard the first ECC sub-block in the subsequent ECC super-block.

6. The DSD of claim 4, wherein the circuitry is further configured to, in response to the first ECC super-block recovering the first ECC sub-block, read the subsequent ECC super-block from the recording surface and use the first ECC sub-block in the first ECC super-block to decode the subsequent ECC super-block.

7. The DSD of claim 4, wherein the circuitry is further configured to, in response to the first ECC super-block failing to recover the first ECC sub-block, use the first ECC sub-block in the subsequent ECC super-bock to transfer data to a host.

8. The DSD of claim 4, wherein the circuitry is further configured to use the first ECC sub-block in the subsequent ECC super block to decode the first ECC super-block.

9. The DSD of claim 1, wherein the first ECC super-block and the subsequent ECC super-block each include metadata indicating the respective ECC sub-blocks contained within the ECC super-block.

10. A method for writing data in a Data Storage Device (DSD) including one or more magnetic disks, the method comprising:
partitioning one or more data blocks into a plurality of data sub-blocks, wherein each of the data sub-blocks of the plurality of data sub-blocks has a first predetermined size;
encoding the plurality of data sub-blocks into a plurality of Error Correction Code (ECC) sub-blocks, wherein each of the ECC sub-blocks has a second predetermined size greater than the first predetermined size;
encoding a first subset of the plurality of ECC sub-blocks into a first ECC super-block, wherein the first subset of the plurality of ECC sub-blocks includes a first ECC sub-block;
writing the first ECC super-block to a recording surface of the one or more magnetic disks;
write-verifying the first ECC sub-block by at least in part reading the first ECC super-block;
in response to the write-verify of the first ECC sub-block passing, encoding a second subset of the plurality of ECC sub-blocks into a subsequent ECC super-block;
in response to the write-verify of the first ECC sub-block failing, encoding the first ECC sub-block and a third subset of the plurality of ECC sub-blocks into the subsequent ECC super-block; and
writing the subsequent ECC super-block to the recording surface.

11. The method of claim 10, wherein the one or more data blocks include at least two data blocks of different sizes.

12. The method of claim 10, further comprising recovering the first ECC sub-block by decoding the first ECC super-block.

13. The method of claim 12, further comprising, in response to the first ECC super-block recovering the first ECC sub-block, reading the subsequent ECC super-block from the recording surface and discarding the first ECC sub-block in the subsequent ECC super-block.

14. The method of claim 12, further comprising, in response to the first ECC super-block recovering the first ECC sub-block, reading the subsequent ECC super-block from the recording surface and using the first ECC sub-block in the first ECC super-block to decode the subsequent ECC super-block.

15. The method of claim 12, further comprising, in response to the first ECC super-block failing to recover the first ECC sub-block, using the first ECC sub-block in the subsequent ECC super-bock to transfer data to a host.

16. The method of claim 12, further comprising using the first ECC sub-block in the subsequent ECC super block to decode the first ECC super-block.

17. The method of claim 10, wherein the first ECC super-block and the subsequent ECC super-block each include metadata indicating the respective ECC sub-blocks contained within the ECC super-block.

18. A Data Storage Device (DSD), comprising: one or more magnetic disks, wherein each magnetic disk of the one or more magnetic disks includes at least one recording surface configured to store data; one or more heads configured to read data from and write data to a respective recording surface of the one or more disks; means for reading a first Error Correction Code (ECC) super-block from a recording surface of the one or more disks, wherein the first ECC super-block includes a first ECC sub-block; means for, in response to the first ECC super-block failing to recover the first ECC sub-block, reading a subsequent ECC super-block from the recording surface; and means for, in response to detecting a copy of the first ECC super-block in the subsequent ECC super-block, using the copy of the first ECC sub-block to transfer data to a host.

19. The DSD of claim 18 further comprising means for using the copy of the first ECC sub-block in the subsequent ECC super block to decode the first ECC super-block.

\* \* \* \* \*